Nov. 20, 1945.   R. MATTHEI   2,389,267
REFRIGERATING STORAGE APPARATUS
Filed Dec. 19, 1941
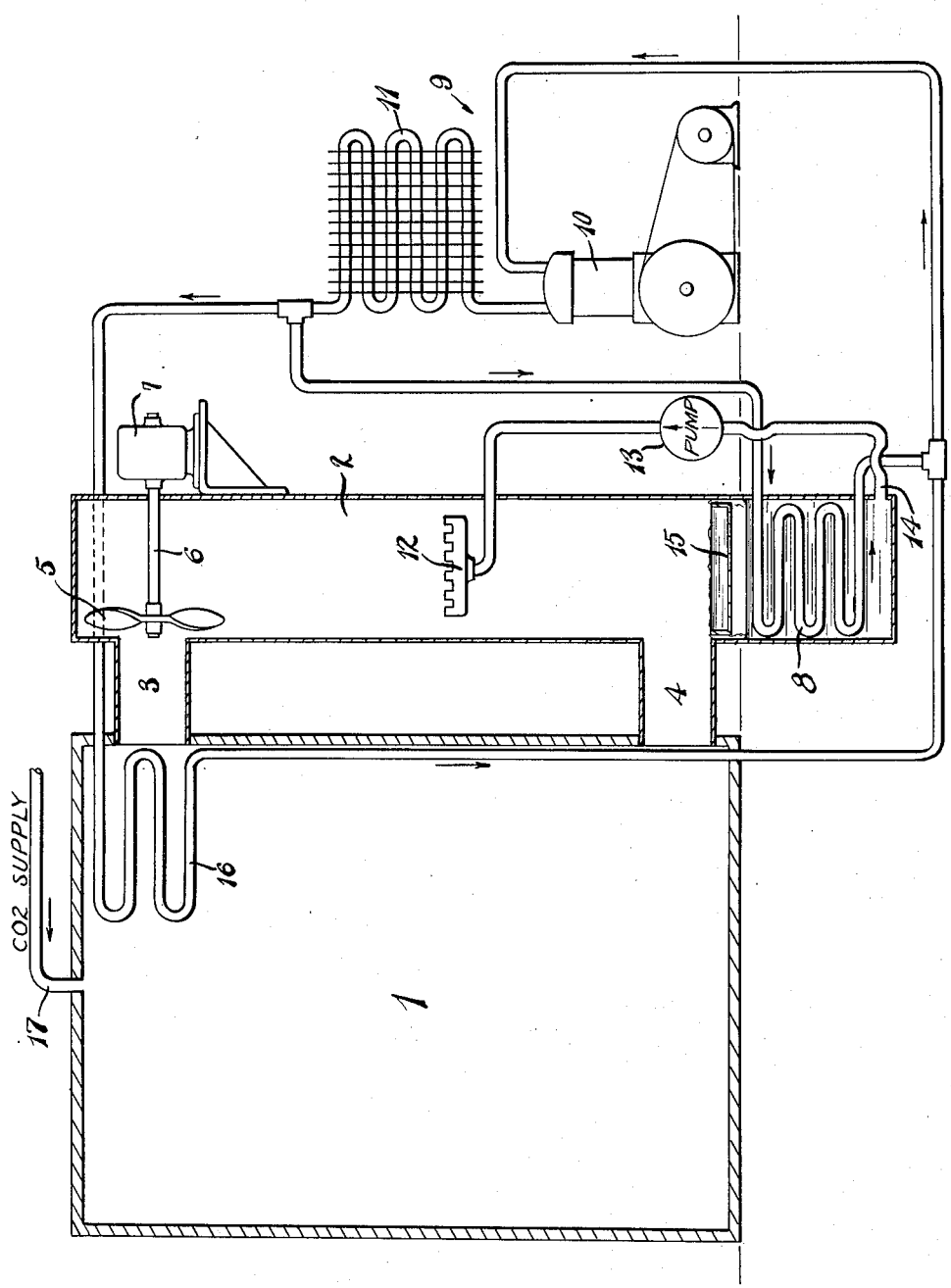
INVENTOR.
ROBERT MATTHEI,
BY Hood & Hahn
ATTORNEYS Patented Nov. 20, 1945

2,389,267

UNITED STATES PATENT OFFICE 2,389,267

REFRIGERATING STORAGE APPARATUS

Robert Matthei, Chicago, Ill., assignor to The Liquid Carbonic Corporation, Chicago, Ill., a corporation of Delaware Application December 19, 1941, Serial No. 423,575

1 Claim. (Cl. 62—104)

The present invention relates to apparatus for the preservation of food by refrigeration.

It has for one of its objects the maintenance of foods of various characters, at the proper refrigerating temperature, to prevent spoilage thereof without the loss incident to such refrigeration as a result of the drying out of the foods while in refrigeration storage.

The invention has for a further object the prevention of spoilage of foods during their refrigeration storage by the destruction of the food by spoilage bacteria, the growth of which are not prevented as the result of the maintenance of the foods in a low temperature.

In the preservation of fresh foods by refrigeration at temperatures above freezing, as distinguished from that type of refrigerating wherein the foods are frozen in temperatures at or below zero, it has been found that the most satisfactory temperature for such refrigeration is about 35° F. However, it has also been found that where foods are maintained at this temperature, unless the atmosphere in which the foods are stored is not less than approximately 95% relative humidity, the foods have a tendency to dry out and, as a result, there is considerable loss in weight of the foods, which means considerable monetary loss in the handling of foods in this manner.

Furthermore, in the storage of frozen foods, for instance, where the humidity is not maintained to the proper point, there is developed what is known as freezer burns in the foods and particularly meat, which show up as blemishes in the foods and which must necessarily be removed before the foods can be sold.

My present invention relates to apparatus for the conditioning of a refrigeration chamber by which the proper temperature and proper relative humidity may be maintained, whereby the drying out of the foods is prevented and the resulting loss of weight accordingly is prevented.

Furthermore, my invention contemplates the refrigeration preservation of the foods in an atmosphere which will prevent the development of spoilage organisms which are not preventable by mere refrigeration or by the mere storage of foods in a low atmosphere.

For the purpose of disclosing my invention, I have illustrated an apparatus embodying my invention in the accompanying drawing, in which:

The figure shows, more or less diagrammatically, such an apparatus.

According to my invention, I provide a refrigerating storage chamber, into which there is delivered a refrigerating atmosphere, properly humidified and chilled. To this end, I provide a storage chamber 1 which may be the storage chamber of any suitable refrigerating box or compartment. Associated with this storage chamber is a cooling and humidifying tower 2 which is provided with an outlet duct 3 discharging into the chamber 1 preferably at its top and an intake duct 4 communicating with the bottom of the chamber 1 and adapted to receive the atmosphere from the chamber. For forcing the atmosphere into the chamber 1 and creating a circulation of atmosphere through the chamber, as well as through the tower 2, I provide a suitable propeller fan 5 mounted on a shaft 6 and driven by any suitable motor such as 7, preferably mounted on the exterior of the tower. For the purpose of cooling the atmosphere and properly humidifying the same, I provide, in the bottom of the tower 2 a set of refrigerating coils 8 which are suitably connected with a refrigerating unit 9, shown diagrammatically as comprising the usual compressor 10 and condenser 11. Accordingly, through the medium of this refrigerating unit 9, a refrigerating material may be circulated through the coils 8 within the bottom of the tower. Within the tower 2, I also provide means for delivering in the tower a spray, which means is illustrated diagrammatically as a spray nozzle 12. This spray nozzle is connected with the delivery side of a circulating pump 13, the intake side of which is connected, as at 14, with the bottom of the tower. Mounted above the coils 8, I provide a pan or receptacle 15 which, as well as the bottom of the tower is adapted to contain a suitable brine solution. The pan 15 overflows into the bottom of the tower so that, as the brine solution drops in the tower, it first falls into the pan 15 and then overflows into the bottom of the tower.

In addition to the refrigerating coil 8, I mount within the refrigerating chamber 1 an additional refrigerating coil 16 which is located near the top of the chamber and is supplied with a refrigerating medium from the unit 9.

The chamber 1 is supplied with an atmosphere of $CO_2$ through the medium of a discharge nozzle 17 connected by a suitable conduit with a source of $CO_2$ supply.

In practice, the pan 15 and the bottom of the tower 2 is supplied with a suitable brine solution which, it will be noted, covers the refrigerating coils 8 and the temperature thereof is accordingly reduced to the proper temperature. This brine solution is sprayed into the upper portion of the tower so that the incoming atmosphere to the tower, passing through the intake conduit 4 will be drawn through the spray solution and absorb sufficient moisture so that it is delivered through the conduit 3 at the desired temperature and humidity. For example the temperature may be approximately 36° F. and the relative humidity 95%. This delivered atmosphere passing into the chamber 1, passes over the refrigerating coils 16, which, it will be noted, are in the path of the air delivered into the chamber and, as a result, the temperature of the atmosphere is reduced to the temperature desired to be maintained in the compartment, with a resulting increase in the relative humidity. With the temperature of the incoming atmosphere at 36° F. and a relative humidity of 95%, the temperature could be reduced to 35° to produce approximately 100% humidity. The atmosphere circulates in the refrigerating chamber and having absorbed the heat of the food to be refrigerated and that transferred by the walls of the refrigerating chamber, is returned to the cooling tower 2 through the conduit 4 to again be properly treated for humidity and temperature.

There are certain spoilage organisms which will develop, irrespective of low temperatures and, in order to prevent the development of these organisms during the storage period, I admit to the refrigerating chamber 1, the desired quantity of $CO_2$ through the nozzle 17 so that the foods to be refrigerated are maintained in an atmosphere of $CO_2$. To be sure, this atmosphere is circulated through the tower 2 but by suitable regulation, the proper amount of $CO_2$ may be admitted to the cooling chamber to maintain the atmosphere at the proper point of saturation.

I have found that a clear or pure water spray, for the purpose of humidification, is not satisfactory because of the fact that in order to cool the atmosphere by such a spray, the temperature of the water, through the medium of the refrigerating coils, would have to be reduced to the point where the water itself would freeze and a spray is not possible. Therefore, in order to deliver a spray of sufficient low temperature to reduce the temperature of the atmosphere to approximately 36° F. or lower, if desired, I have found it desirable to use a brine solution, the temperature of which may be reduced to as low a point as desirable without the danger of the solution becoming frozen. However, a brine solution, or any dissolved salt, will not give 100% humidity to the atmosphere. The water vapor varies with the amount of salt used in the solution, but under no circumstances will the salts give up sufficient of their water solution to provide 100% humidity. Therefore, by the use of a salt solution for the purpose of humidifying and refrigerating the air in the chamber 1, it would be practically impossible to maintain 100% relative humidity in the chamber. However, by the provision of the refrigerating coil 16 in the path of the atmosphere entering the chamber 1, the temperature of this atmosphere is reduced to the point where the relative humidity of the atmosphere is approximately 100%.

In actual practice, I find it desirable to operate the cooling chamber 1 at 35° F. This has been discovered to be the most satisfactory refrigerating temperature for the preservation of foods. The cooling tower is adjusted to cool and humidify the atmosphere to approximately 36° F. at 95% relative humidity. This, of course, can be obtained by the proper proportion of water spray, together with the proper refrigeration thereof. This atmosphere at 36° F. with the relative humidity of 95%, is delivered across the refrigerating coil 16 at the intake side of the chamber 1 and, as it passes over these cooling coils, the temperature of the atmosphere is reduced to 35° F., which will result in 100% relative humidity and, due to the fact that $CO_2$ is admitted to the chamber, the foods stored therein are maintained at a temperature of 35° F. in an atmosphere of $CO_2$ at approximately 100% relative humidity, thereby preventing the drying of foods and the accompanying loss of weight thereof and, at the same time preventing the development of spoilage organisms, thus preserving the food against spoilage and dehydration. The low temperature will not inhibit certain types of organisms, such for instance as slime producing organisms and certain mold growths and such organisms not inhibited by low temperature will be inhibited by the $CO_2$. Therefore, I am enabled to accomplish extremely efficient preservation.

It is obvious that air or $CO_2$ may comprise the refrigerating atmosphere and that in either case the temperature and relative humidity may be maintained in the same manner.

I claim as my invention:

A refrigerating storage apparatus comprising a storage chamber having an intake at its top and an outlet at its bottom, a refrigerating coil arranged in the top of said chamber adjacent said intake, a cooling tower exterior of said chamber having a delivery outlet communicating with said chamber inlet and an intake communicating with the outlet of said chamber, a cooling coil arranged in the bottom of said tower, a collection pan mounted above said cooling coil, and spraying means located in said tower above said cooling coils, means for circulating an aqueous solution through said spraying means and over said cooling coils, and blower means arranged in the top of said tower for causing a circulation of refrigerating atmosphere through said tower and through said refrigerating chamber.

ROBERT MATTHEI.